US007015934B2

(12) United States Patent
Toyama et al.

(10) Patent No.: US 7,015,934 B2
(45) Date of Patent: Mar. 21, 2006

(54) IMAGE DISPLAYING APPARATUS

(75) Inventors: Osamu Toyama, Kakogawa (JP); Eiro Fujii, Takatsuki (JP); Yuzuru Tanaka, Ibaraki (JP)

(73) Assignee: Minolta Co., Ltd., Osaka (JP)

( * ) Notice: Subject to any disclaimer, the term of this patent is extended or adjusted under 35 U.S.C. 154(b) by 261 days.

(21) Appl. No.: 09/985,546

(22) Filed: Nov. 5, 2001

(65) Prior Publication Data
US 2002/0054047 A1 May 9, 2002

(30) Foreign Application Priority Data
Nov. 8, 2000  (JP) ............................. 2000-339906

(51) Int. Cl.
G09G 5/00 (2006.01)
(52) U.S. Cl. ...................................... 345/629; 700/753
(58) Field of Classification Search ................ 345/629, 345/619, 733, 751, 716, 753, 759, 756, 757, 345/798; 725/135; 370/260; 348/14.09
See application file for complete search history.

(56) References Cited

U.S. PATENT DOCUMENTS

| 4,827,532 A | * | 5/1989 | Bloomstein ................ 382/100 |
| 5,206,721 A | * | 4/1993 | Ashida et al. ............. 348/14.1 |
| 5,347,306 A | * | 9/1994 | Nitta ........................ 348/14.1 |
| 5,734,794 A | * | 3/1998 | White ....................... 704/275 |
| 5,907,351 A | * | 5/1999 | Chen et al. .............. 348/14.12 |
| 5,923,737 A | * | 7/1999 | Weishut et al. .......... 379/93.17 |
| 5,953,049 A | * | 9/1999 | Horn et al. ............. 348/14.09 |
| 5,978,835 A | * | 11/1999 | Ludwig et al. ............. 709/204 |
| 5,995,096 A | * | 11/1999 | Kitahara et al. ............ 715/753 |
| 5,995,119 A | * | 11/1999 | Cosatto et al. ............. 345/473 |
| 6,047,078 A | * | 4/2000 | Kang ........................ 382/107 |
| 6,072,496 A | * | 6/2000 | Guenter et al. ............ 345/419 |
| 6,112,177 A | * | 8/2000 | Cosatto et al. ............. 704/260 |
| 6,219,086 B1 | * | 4/2001 | Murata ........................ 725/1 |
| 6,237,025 B1 | * | 5/2001 | Ludwig et al. ............. 709/204 |
| 6,473,114 B1 | * | 10/2002 | Strubbe .................. 348/14.07 |
| 6,496,594 B1 | * | 12/2002 | Prokoski .................... 382/118 |
| 2002/0067362 A1 | * | 6/2002 | Nocera et al. ............. 345/473 |

FOREIGN PATENT DOCUMENTS

| JP | 6-52290 | 2/1994 |
| JP | 11-226050 | 8/1999 |

* cited by examiner

Primary Examiner—Ryan Yang
(74) Attorney, Agent, or Firm—McDermott Will & Emery LLP

(57) ABSTRACT

The present invention aims at realizing displaying of a realistic image of a conversation scene in which a speaker can be visually recognized by people watching this image regardless of the content of the image. To this end, according to the present invention, a two-dimensional or three-dimensional face model is deformed, and animations $A1_i$ through $A3_i$ which express a state in which a person is speaking are consequently created and displayed as auxiliary images.

20 Claims, 9 Drawing Sheets (A)

(B)

IMAGE DISPLAYING APPARATUS

RELATED APPLICATION

This application is based on application No. 2000-339906 filed in Japan, the entire content of which is hereby incorporated by reference.

BACKGROUND OF THE INVENTION

1. Field of the Invention

The present invention relates to an image displaying apparatus which displays a main image accompanying a auxiliary image.

2. Description of the Related Art

A technology is known which combines an animated image, which is a cartoon of lips, sign language or the like to communicate what someone said, as auxiliary information with a main image. For example, a known technique is for linking images of lips or sign language prepared in advance with each other in accordance with inputted text data.

Meanwhile, with respect to a video conference system equipped with a translation function, another technique is known which partially replaces an actual image with an animated image in tune with the voice of a translation. With this, by means of partial replacement of images, it is possible to provide natural images of people which match with the voice of a translation. The following is the details of replacement of an image. (1) Prepare a three-dimensional model of a human head portion and a texture of a mouth area of an attendee to a conference in advance. (2) Analyze actually shot images of the conference and detect the direction of the head portion of a speaker. (3) Correct the coordinate system of the three-dimensional model in accordance with movements of the head portion of the speaker. (4) Paste a texture of the speaker to the three-dimensional model and create animated images. (5) Replace the mouth area of the speaker in the actual images with the animated images.

Animated images of moving lips serving as conventional auxiliary information is not based on appearance information regarding people who appear in main images, and therefore, have a problem that the animated images do not look real very much. Available as a technique for providing more realistic auxiliary information is to synthesize an actually shot close-up of a human mouth area. However, this technique requires to shoot a close-up with a different camera from a main image camera or to execute image processing of extracting and enlarging a part of a main image. The former leads to a problem that shooting becomes a large-scale one, and there is a restriction that it is necessary to create auxiliary information at the same time with main images. The latter has a problem that when a person does not stay at a constant position in main images or more than one people appear in main images, it is difficult to extract by means of automatic image processing a particular part showing a speaker without fail.

On the other hand, where images with a plurality of people appearing are to be displayed as in the case of a video conference or in a scene of a conversation, the faces of all people do not necessarily appear with a sufficient size in images all times. For instance, when broadcasting a meeting attended by a large number of people, some attendees may turn their back to a camera sometimes. Further, even when there is only one person to be shot as in a solo scene in a drama, if the shot is to show this person from back or in a far distance, this person's face may not appear in the image or may look small even if appearing. Hence, a conventional apparatus which partially replaces a human body in images with animations bears a problem that people watching the images can not visually recognize who in the images is saying what.

SUMMARY OF THE INVENTION

The object of the present invention is to realize displaying of a realistic image of a conversation scene in which a speaker can be visually recognized by people watching this image regardless of the content of the image.

According to the present invention, a face model prepared in advance is deformed to create an animated image expressing a condition in which a person is speaking, and the animated image is displayed as auxiliary information to a main image. The animated image may be displayed while displaying the main image and using a part of a display area for the main image, or in a different display area from that for the main image. When a main image is an actual shot of people, a face model, which serves as the original from which an animation is to be created, may be created based on a result of shape measurement on a person who is to be displayed, so that a realistic animation can be created.

The invention itself, together with further objects and attendant advantages, will best be understood by reference to the following detailed description taken in conjunction with the accompanying drawings.

BRIEF DESCRIPTION OF THE DRAWINGS

In the following description, like parts are designated by like reference numbers throughout the several drawing.

DESCRIPTION OF THE PREFERRED EMBODIMENT

Figure 1:
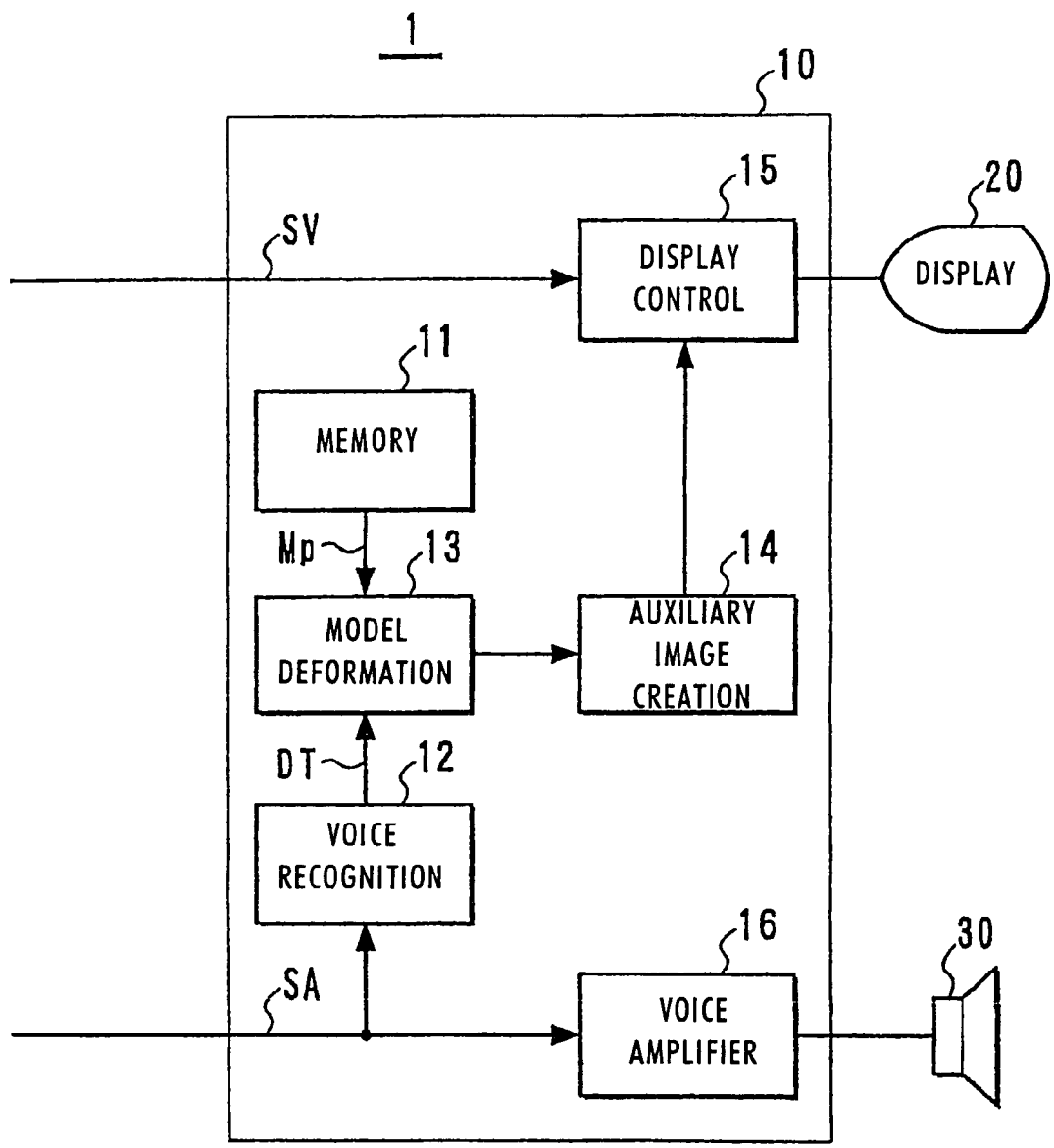
FIG. 1 is a block diagram showing a functional structure of an image displaying apparatus according to the present invention.

FIG. 1 is a structure diagram of an image displaying apparatus according to the present invention. The image displaying apparatus 1 is displaying means with a voice reproducing function which is formed by a signal processing circuit 10, a display 20 and a speaker 30, and is used as a monitor unit of a video conference system, a television receiver or the like.

The signal processing circuit 10 drives the display 20 and the speaker 30 in accordance with a video signal SV and an audio signal SA which are inputted through a front-stage circuit not shown. The driving is controlled by a display control block 15 and a voice amplifier block 16. When the video signal SV represents actually shot images showing a scene of a person speaking, the signal processing circuit 10 creates animated images expressing a state in which the person is speaking, and the actually shot images and the animated images which are auxiliary information to the actually shot images are displayed at the same time. The signal processing circuit 10 comprises, as functional elements related to displaying of an animation, a memory 11, a voice recognition block 12, a model deformation block 13 and an auxiliary image creating block 14. The memory 11 stores face models Mp representing a plurality of people. The face models Mp are three-dimensional models which are based on results of actual measurement of shapes and texture shooting. The voice recognition block 12 judges who a speaker is based on the audio signal SA, and creates text data DT which represents what is spoken. The model deformation block 13 deforms the face model Mp of the speaker in accordance with the text data DT. The auxiliary image creating block 14 creates animated images expressing the appearance of the face model Mp of the speaker. The display control block 15 combines the animated images with the actually shot images.

Efficient as a method of creating the face models Mp is to prepare a standard model for animation and deform the standard model in accordance with shape data which are extracted from a person who is to be displayed. Creation of the face models Mp using information regarding this person makes the auxiliary information more realistic. Use of a model in which a bone structure can be displaced and muscles can be deformed makes it possible to express movements of the mouth and facial expressions more realistically.

Figure 2:
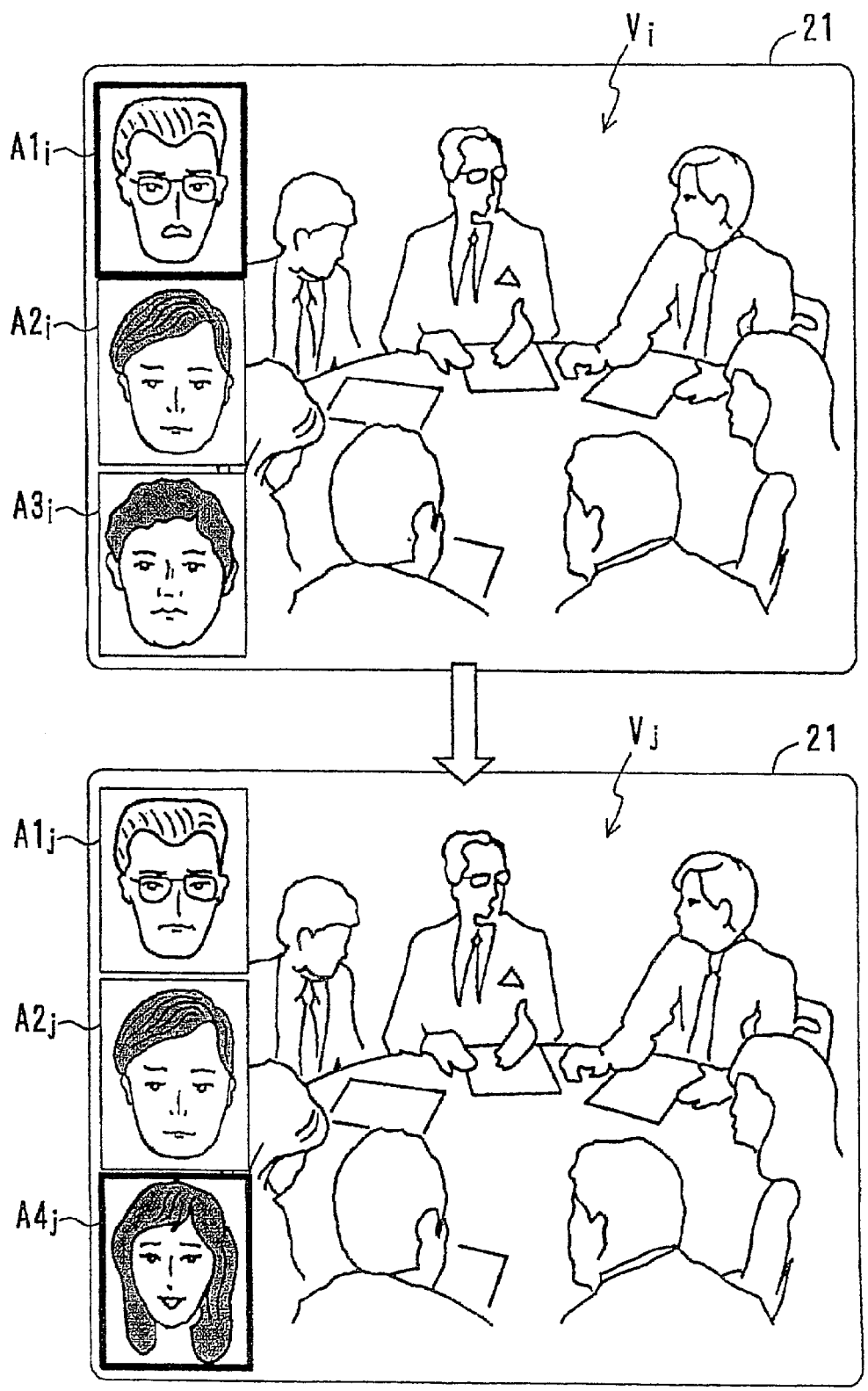
FIG. 2 is a drawing showing an example of a displayed image.

FIG. 2 shows one example of a displayed image. In FIG. 2, the suffixes i and j of the reference symbols denote the time of displaying. In the following, the suffixes will be omitted when not discriminating the time. On a display screen 21 of the display 20, animated images A1, A2, A3 and A4, which are the auxiliary information, are displayed together with a main image V corresponding to the video signal SV. The main image V in this example is a moving image showing seven people discussing. The animated images A1 through A4 are full-face images of three-dimensional models with textures which are based on data regarding those people who are participating in the discussion, and express movements of the mouths of these people and their facial expressions. In FIG. 2, for the purpose of avoiding display sizes from becoming small, the number of people to be displayed as animated images is limited to three. The three people are the current speaker, the immediately previous speaker and the person who spoke before the immediately previous speaker. The animated image corresponding to the current speaker is emphasized with bordering, coloring, etc. In FIG. 2, at the time i, the three animated images $A1_i$, $A2_i$, and $A3_i$ are arranged one atop the other on the left-hand side to the main image $V_i$, and of these, the animated image $A1_i$ is emphasized. As the speaker changes, the different animated images are displayed. At the time j, the animated image $A4_j$ is displayed and emphasized in place of the animated image $A3_i$ which used to be displayed at the time i.

Figure 3:
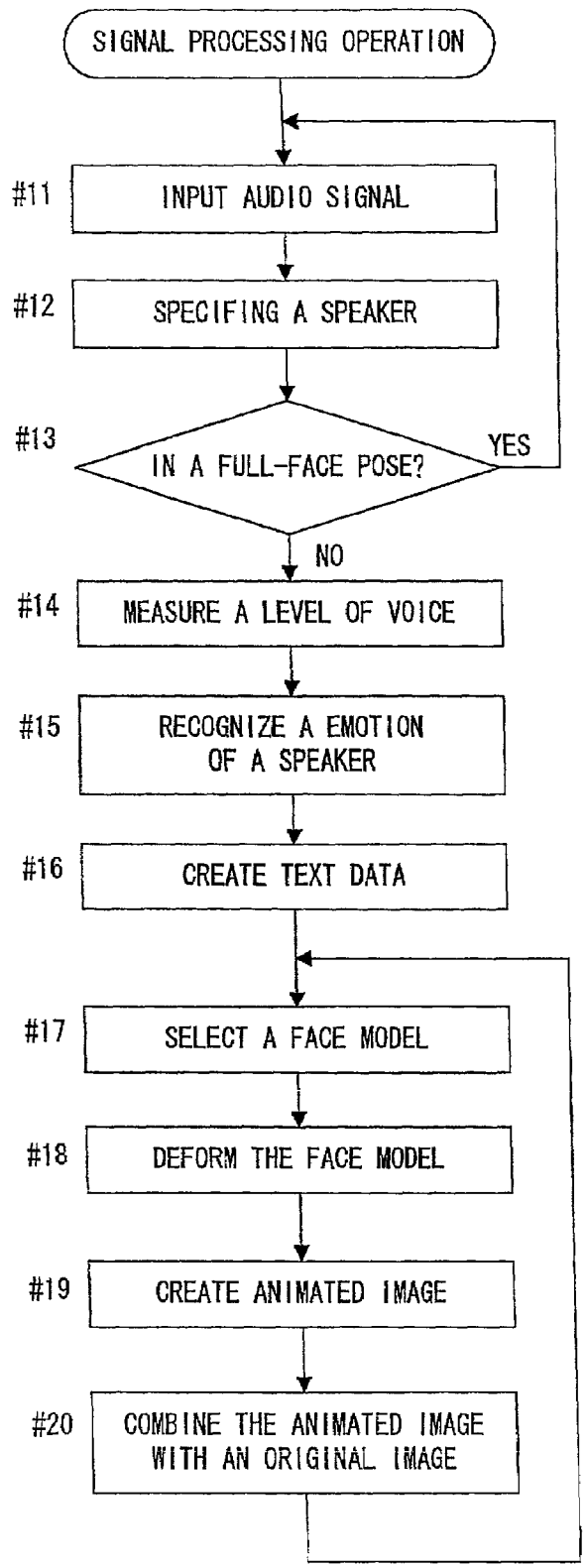
FIG. 3 is a flow chart showing signal processing operations in the image displaying apparatus.

Now, operations of the image displaying apparatus will be described in more details. FIG. 3 is a flow chart showing signal processing operations in the image displaying apparatus. The image displaying apparatus 1 receives the audio signal SA and specifies a speaker (#11, #12). Specifying of the speaker may be methods described below. (1) Register the features of voices of attendees in advance, and specify who a speaker is by a voice recognition technique; (2) In the case of a video conference system having a function of automatically directing a camera to a speaker, specify a speaker using camera control information; (3) In the case of a multi-channel audio system wherein each one of a plurality of people is equipped with a microphone, specify a speaker by means of detection of a voice level.

Figure 6:
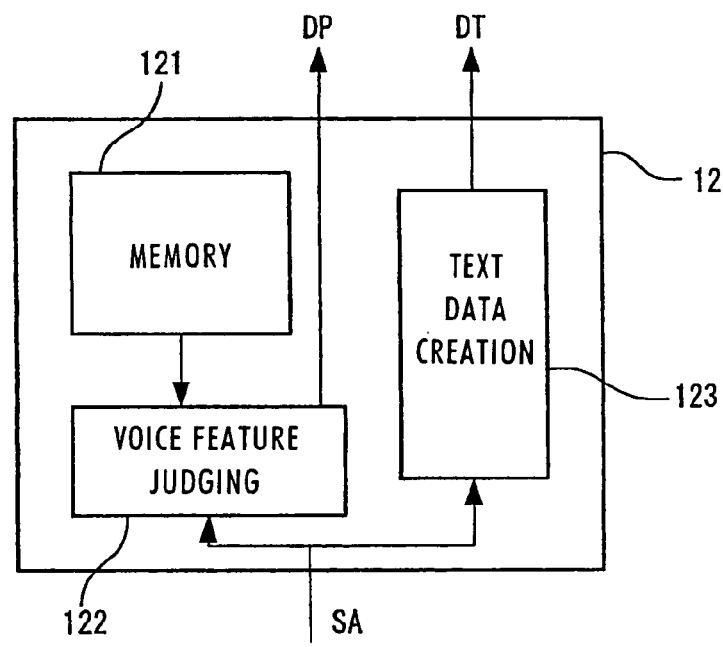
FIG. 6 is a block diagram showing an example of a functional structure of a voice recognition part.

FIG. 6 is a block diagram showing an example of a functional structure of a voice recognition block. The method (1) above is realized by the voice recognition block which is shown in FIG. 6. The voice recognition block 12 comprises a memory 121 which stores the features of voices of a plurality of people, a voice feature judging block 122 which compares the audio signal SA with the features of voices stored in the memory 121 and specifies a speaker which is represented by the audio signal, and a text data creating block 123 which creates text data from the audio signal SA.

When a main image is an image showing seven people discussing as in the case of the illustrated example, the memory 121 stores the features of voices of the seven people in advance. The voice feature judging block 122, referring to the features of voices of the seven people stored in the memory 121, judges from who among the seven people speaking the audio signal SA was created. Further, the voice feature judging block 122 creates data which specify one of the seven people, namely, person specifying data DP, as a result of the judgment. The created data DP is fed to the model deformation block 13 and a frame position determining block 142 (See FIG. 9.) which will be described later. On the other hand, the text data creating block 123 creates text data DT from the inputted audio signal using a known method, associates the data DT with the data DP and outputs to the model deformation block 13.

Figure 7:
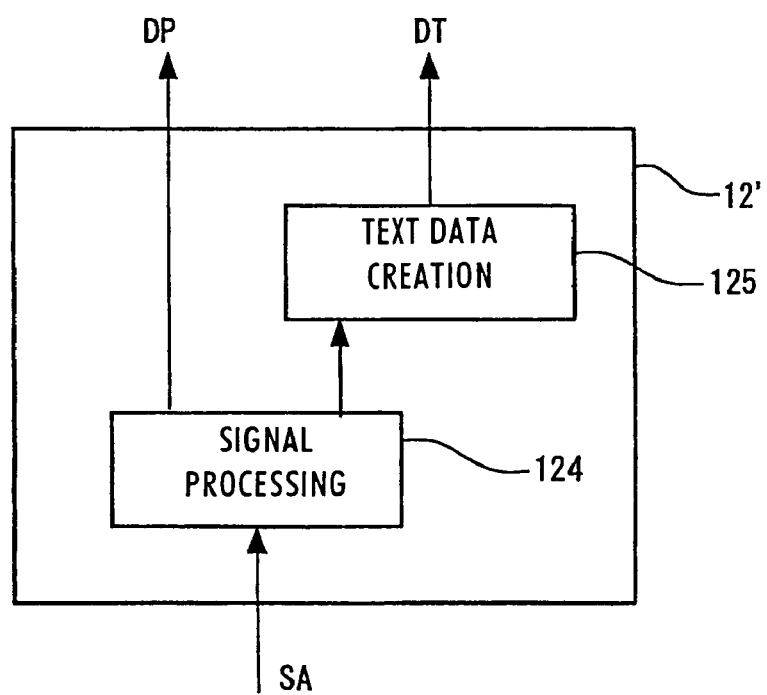
FIG. 7 is a block diagram showing other example of the functional structure of the voice recognition part.

FIG. 7 is a block diagram showing other example of the functional structure of the voice recognition block. The method (2) above is realized by the voice recognition block 12' which is shown in FIG. 7. The voice recognition block 12' comprises a signal processing block 124 which separates data which specify a person and voice data from the audio signal, and a text data creating block 125 which creates text data from voice data separated by the signal processing block 124 using a known method.

In short, in this case, the camera control information described above is already included in the audio signal SA as data which specify a person. The signal processing block 124 separates the camera control information from such an audio signal SA and creates the person specifying data DP. On the other hand, the voice data contained in the audio signal SA are converted into the text data DT in the text data creating block 125.

A structure for realizing the method (3) above will also be described with reference to FIG. 7. However, the function of the signal processing block 124 of the voice recognition block 12' is different from the one described above. In the case (3) above, the audio signal SA is classified into multi channels. Hence, it is possible to create the person specifying data DP by judging the channels. The text data creating block 125 creates the text data DT in a similar manner to the above, for the voice data corresponding to the respective channels.

Referring back to FIG. 3 again, whether a speaker is in a full-face pose toward a camera or not is judged (#13). With a positional relationship between the plurality of people and the camera registered in advance, this judgment is possible.

In addition, with appearance information regarding the people registered, it is possible to judge the direction of the face of a speaker by image recognition. If a full-face pose is the result of the judgment and it is certain that the speaker is appearing sufficiently large in a main image, that is, if the main image clearly shows a state in which the person is speaking including facial expressions of the speaker, an animated image of the speaker will not be displayed. Such control of selecting the auxiliary information depending on in which direction the speaker is facing is favorable to effectively utilize a display area specially when the display area is small. However, the judgment at the step #13 may be omitted and an animated image of the speaker may be displayed regardless of the direction of the face.

Figure 9:
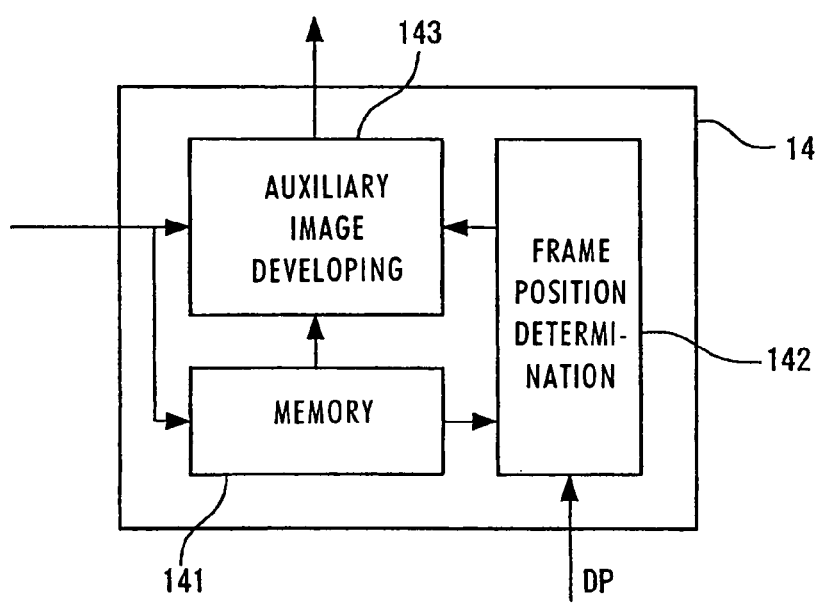
FIG. 9 is a block diagram showing a functional structure of an auxiliary image creating part.

FIG. 9 is a block diagram showing a functional structure of the auxiliary image creating block 14. The auxiliary image creating block 14 is formed by a memory 141 which stores face images regarding the people deformed by the model deformation block 13, information which indicates, based on the arrangement of each person in a main image, whether each person is facing the front or not, a speech history regarding each person, etc., the frame position determining block 142 which determines persons to be displayed within frames in an area (auxiliary image area) for displaying auxiliary images based on the speech histories and the information regarding whether the people are facing the front or not stored in the memory 141 in response to the person specifying data DP received from the voice recognition block 12, and an auxiliary image developing block 143 which fits, in the respective frames in the auxiliary image area, information regarding which persons are to be displayed in the respective frames determined by the frame position determining block 142 and the face images on these persons stored in the memory 141 or an image of a speaker sent from the model deformation block 13, and accordingly develops auxiliary images.

The frame position determining block 142 determines a person according to the person specifying data DP as a frame for displaying an animation, and the face images stored in the memory 141 are displayed in the other frames. Assume that there are only three frames in the auxiliary image area while seven people appear as shown in FIG. 2, and that any one of three people has finished speaking and someone else other than these three people has started speaking. In this circumstance, the frame position determining block 142 refers to the speech histories stored in the memory 141 and determines that a frame for the person who spoke the earliest among the three people displayed as auxiliary images is a frame for displaying an animation of the person who has just started speaking. In other words, the animated image of the person who spoke the earliest among the three people is replaced with an animated image of the new speaker.

In the case that all the people are to be displayed within the frames in the auxiliary image area, the frame position determining block 142 is not necessary and it is not necessary to store speech histories in the memory 141. In addition, when the face of a speaker is to be displayed as an auxiliary image regardless of the direction of the face, it is not necessary to store the information regarding whether the speaker is facing the front in the memory 141.

Referring back to FIG. 3 again, when an animated image is to be displayed, the level of a voice and a speech speed are measured (#14), and an emotion of a speaker is recognized (#15). More specifically, based on information such as the level of a voice, a pitch, a speed and the like, one of emotions such as "normal, pleasure, surprise, anger, sorrow" which are set in advance is selected. Using an available voice/text conversion technique, the text data DT indicating the content of a remark is created (#16).

Next, the face model of the speaker is read from the memory 11 and deformed so as to match with the emotion recognition result and the text data DT (#17, #18). With standard models expressing phonemes and emotions structured in advance, it is easy to select a standard model which matches the emotion recognition result and the text data DT and deform the face model of the speaker applying a deformation degree for the standard model.

Figure 8:
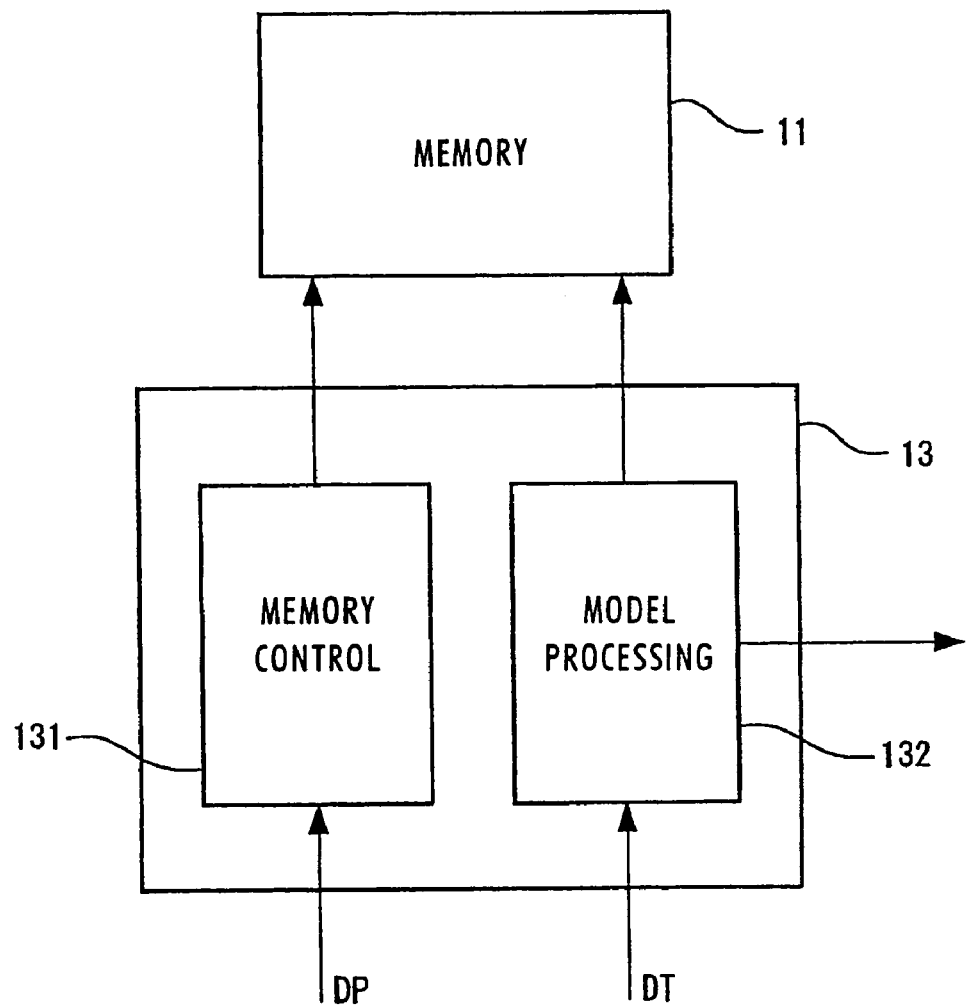
FIG. 8 is a block diagram showing a functional structure of a model deformation part.

FIG. 8 is a block diagram showing a functional structure of the memory 11 and the model deformation block 13. The model deformation block 13 comprises a memory control part 131 which receives the person specifying data DP from the voice recognition block 12 and controls the memory, and a model processing block which deforms the face models stored in the memory based on the text data DT.

The memory control part 131 controls the memory 11 so as to read out the face model of a person which corresponds to the person specifying data DP. The face model thus read is loaded into a model processing block 132. The model processing block 132 deforms the received face model so that the face model matches with the text data received from the voice recognition block 12.

Referring back to FIG. 3 again, next, an animated image is created which expresses a change to the deformed face model deformed in accordance with the current speech from the last face model which was displayed before to show this speaker (#19). At this stage, the speech speed is added for intra-model supplement. The resultant animated image is combined with the main image and displayed (#20).

Figure 4:
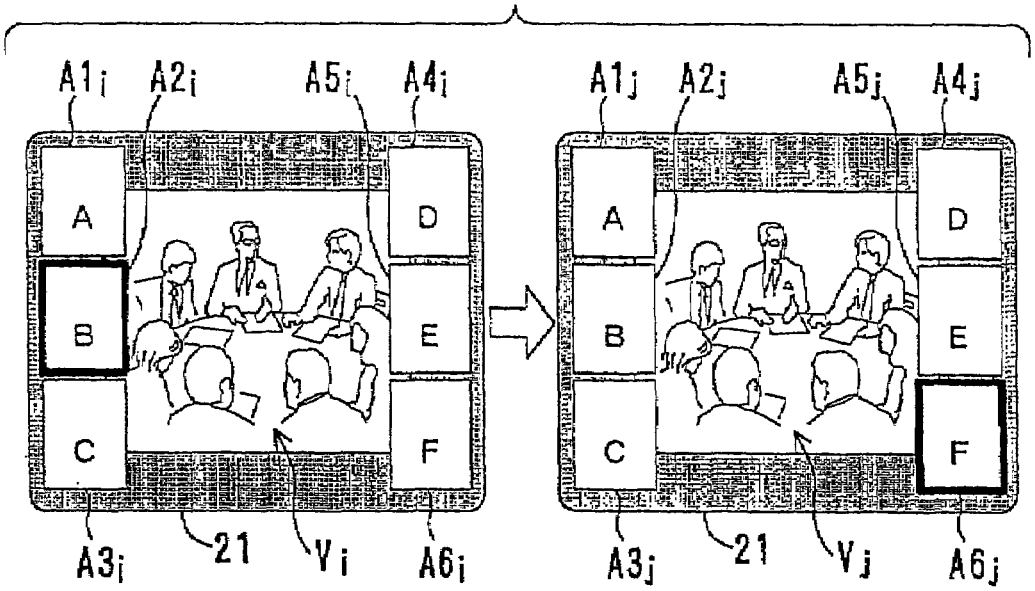
FIG. 4 is a drawing showing a modified example of a display mode.
Figure 4:
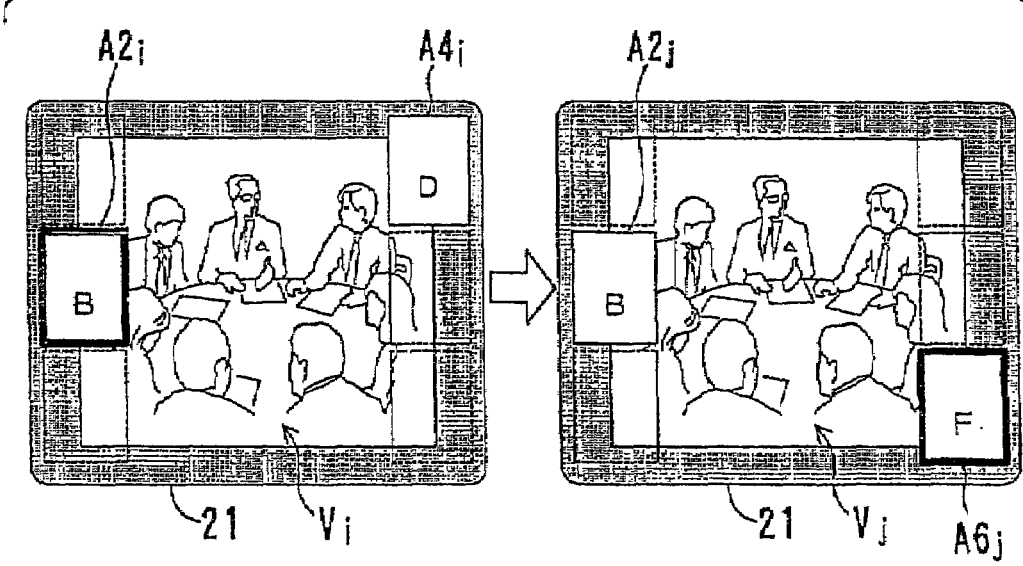

FIG. 4 shows a modified example of a display mode. In FIG. 4(A), animated images A1 through A6 for a fixed number of people (six people in this example) are always displayed and a speaker is emphasized. With animated images displayed to show more people, more realistic sensations are provided. In FIG. 4(B), while fixed areas are allocated to display animated images of a plurality of people, the number of animated images to display simultaneously is limited to two which are the current speaker and a person who spoke immediately before.

In the preferred embodiment described above, the memory 11 may be a structure to store face models via data telecommunications. For instance, in cable TV broadcasting, face models of those who take part in a drama are transmitted before airing the drama program. An audience may select whether to wish for the transmission. Once the drama gets on the air, the image displaying apparatus 1 displays animated images in synchronization to what the actors and the actresses say.

The face models Mp may be two-dimensional models. When a person without an associated face model Mp registered is included in those who are to be displayed, a texture extracted from a main image may be pasted to a standard model to thereby create a face model of this person. If extraction from the main image as well is difficult, one of substitute face models of a plurality of types prepared in advance may be selected and used.

Figure 5:
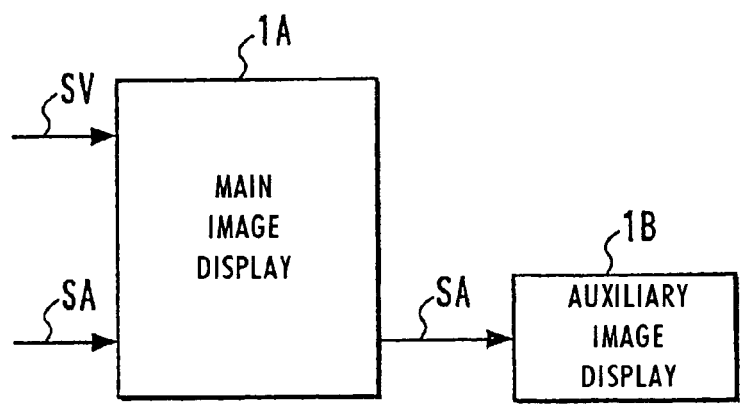
FIG. 5 is a drawing showing a modified example of the structure of the apparatus.

It is not always necessary to display a main image and an animated image laid out in one display area. Instead, an auxiliary image displaying apparatus 1B which is separate from a main image displaying apparatus 1A may display an animated image as shown in FIG. 5. In this case, the auxiliary image displaying apparatus 1B may have basically a similar structure to that of the image displaying apparatus 1 which is shown in FIG. 1. However, the display control block 15 of the auxiliary image displaying apparatus 1B does not need to receive the video signal SV, and the display control block 15 may control displaying of only an animated image which is supplied from the auxiliary image creating block 14. Further, where the main image displaying apparatus 1A is responsible for reproducing a voice, the voice amplifier block 16 and the speaker 30 may be omitted in the auxiliary image displaying apparatus 1B. If it is not necessary to create a face model from the video signal SV, it is not necessary to input the video signal SV to the auxiliary image displaying apparatus 1B, and therefore, only the audio signal SA may be supplied to the auxiliary image displaying apparatus 1B via the main image displaying apparatus 1A or directly from a front-stage circuit (Illustrated in the drawing is to supply via the main image displaying apparatus.).

Although the present invention has been fully described byway of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An actually shot image displaying apparatus comprising:
   a first displaying portion at which an actually shot image is displayed;
   a voice information obtainer for obtaining voice information;
   an image creator for creating an animated face image which expresses appearances of speech by a person by means of deforming a two-dimensional face model or a three-dimensional face model in accordance with the obtained voice information; and
   a second displaying portion at which a plurality of animated face images are displayed and laid out as an auxiliary image including the animated face image which expresses appearances of speech by a person, the plurality of animated face images correspond to persons in the actually shot image, wherein
   the first displaying portion and second displaying portion are arranged on a same display screen, and the animated face image, which expresses appearances of speech by a person and corresponds to a person who is speaking, is displayed distinctively from the other animated face images; and
   when a person without an associated face model Mp registered is included in those who are to be displayed, a texture extracted from a main image may be pasted to a standard model to thereby create a face model of this person.

2. The image displaying apparatus according to claim 1, wherein a unit including the first displaying portion and a unit including the second displaying portion are different units.

3. The image displaying apparatus according to claim 1, wherein the first displaying portion and the second displaying portion are included in a unit.

4. The image displaying apparatus according to claim 1, wherein the animated face image expresses a full-face pose.

5. The image displaying apparatus according to claim 1, wherein there is a two-dimensional face model or the three-dimensional face model corresponds to each person represented in the actually shot image.

6. An actually shot image displaying apparatus comprising;
   a first displaying portion at which an actually shot image is displayed;
   a voice information obtainer for obtaining voice information;
   an image creator for creating an animated face image which expresses appearances of speech by a person by means of deforming a two-dimensional face model or a three-dimensional face model in accordance with the obtained voice information;
   a second displaying portion at which a plurality of animated face images are displayed and laid out as an auxiliary image including the animated face image which expresses appearances of speed by a person, the plurality of animated face images correspond to persons in the actually shot image; and
   a determiner for determining whether a direction of a person represeted in the actually shot image is full-face pose or not, wherein
   a first displaying portion and second displaying portion are arranged on a same display screen, and the animated face image, which expresses appearances of speech by a person and corresponds to a person who is speaking, is displayed distinctively from the other animated face images, and
   the second displaying portion displays an animated face image of a person which direction is determined as a not full-face pose by the determiner and does not display an animated face of a person which direction is determined as a full-face pose as the actually shot image will sufficiently show facial expressions when the person is speaking.

7. An image creating system comprising:
   an image acquiring portion for acquiring image signals representing an actually shot image;
   a voice acquiring portion for acquiring voice signals for representing voice accompanying the actually shot image;
   a model storing memory for storing a plurality of models;
   a specifying processor for specifying a model from the plurality of models stored in the model storing memory on the basis of the acquired voice signals;
   a memory controller for read out of the specified model from the model storing memory;
   an image creating processor for creating an animated face image by deforming the read out model; and
   a display including
      a first displaying portion for displaying the image signals representing the actually shot image, and
      a second displaying portion for displaying, as an auxiliary image, a plurality of animated face images including the animated face image created by deforming the read out model, the plurality of animated face images correspond to persons in the actually shot image, wherein
   the first displaying portion and second displaying portion are arranged together on the display, and the animated face image created by deforming the read out model, which corresponds to a person who is speaking, is displayed distinctively from the other animated face images; and
   when a person without an associated face model Mp registered is included in those who are to be displayed, a texture extracted from a main image may be pasted to a standard model to thereby create a face model of this person.

8. The image creating system according to claim 7, further comprising a voice feature storing memory for storing a plurality of voice features respectively corresponding to the plurality of models, wherein
the specifying processor refers the voice features to specify a model.

9. The image creating system according to claim 7, wherein
the voice signals include voice data and data for specifying a speaker, and
the specifying processor refers the data for specifying a speaker to specify a model corresponding to the voice data.

10. The image creating system according to claim 9, wherein the data for specifying a speaker is obtained from an apparatus for creating the actually shot image.

11. The image creating system according to claim 9, wherein
the voice signals comprise multiple channels, and
the data for specifying a speaker is one channel of the multiple channels.

12. The image creating system according to claim 9, wherein the display displays the plurality of animated face images over the actually shot image, and a location of each displayed animated face image is unrelated to the location of the person in the actually shot image that said each displayed animated face image corresponds to.

13. An actually shot image displaying system for displaying a plurality of persons, the system comprising:
a main image displaying portion for displaying an actually shot image which represents positional relationship of a plurality of persons;
a speaker for producing sounds which represents voice of the plurality of persons;
an auxiliary image displaying portion which has a plurality of frames each of which displays an animated full-face pose image of a person, the animated full-face pose image in each of the plurality of frames corresponds to a person in the actually shot image;
a determining processor for determining from which person of the plurality of the persons a voice is produced, on the basis of the voice to be represented by the speaker;
a creating processor for creating an animated full-face pose image of a person determined by the determining processor as the person from which the voice is produced; and
a display controller for controlling the auxiliary image displaying portion to display the created animated full-face pose image within one frame of the plurality of frames, wherein
the main image displaying portion and the auxiliary image displaying are arranged on a same display screen and the created animated full-face pose image of the person determined as the person from which the voice is produced is displayed distinctively from the other animated full-face pose images; and
when a person without an associated face model Mp registered is included in those who are to be displayed, a texture extracted from a main image may be pasted to a standard model to thereby create a face model of this person.

14. The image displaying system according to claim 13, wherein the one frame with the animated full-face pose image is predetermined for every person.

15. The image displaying system according to claim 13, wherein the display controller controls the auxiliary image displaying portion to display only the animated full-face pose image that is determined by the determining processor in a predetermined frame among the plurality of frames, and the actually shot image and/or other images are displayed where the plurality of frames are not displayed.

16. The image creating system according to claim 7, wherein the specifying processor specifies a plurality of models, and the display displays a plurality of animated face images corresponding to the specified plurality of models.

17. The image creating system according to claim 7, wherein the auxiliary image creating processor creates the animated face image by modifying the model based on voice information.

18. An actually shot image displaying apparatus, comprising:
a visual information input section which obtains visual information by actually shooting an image with a camera;
an audio information input section which obtain audio information;
an image generator which selects a face model stored in a memory, and deforms the face model selected based on the audio information to create an animated face image; and
a controller which controls to display on a display device an image of the actually shot image together with an auxiliary image having a plurality of animated face images including the animated face image created by the image generator, the plurality of animated face images correspond to persons in the actually shot image, wherein
the animated face image created by the image generator, which corresponds to a person who is speaking, is displayed distinctively from the other animated face images; and
when a person without an associated face model Mp registered is included in those who are to be displayed, a texture extracted from a main image may be pasted to a standard model to thereby create a face model of this person.

19. The image displaying apparatus according to claim 18, wherein the controller controls to display a plurality of deformed face model in a same screen of the display device.

20. The image displaying apparatus according to claim 18, wherein the controller controls to display a plurality of deformed face model adjacent mutually in a same screen of the display device.

* * * * *